April 24, 1956 E. BAUMAN 2,743,361

SELECTIVE SQUELCH RECEIVER

Filed Jan. 23, 1952 2 Sheets-Sheet 1

INVENTOR.
Edward Bauman
BY
Foorman L. Mueller
Atty.

April 24, 1956

E. BAUMAN 2,743,361

SELECTIVE SQUELCH RECEIVER

Filed Jan. 23, 1952

2 Sheets-Sheet 2

INVENTOR.
Edward Bauman
BY
Foorman L. Mueller
Atty.

2,743,361
Patented Apr. 24, 1956

2,743,361

SELECTIVE SQUELCH RECEIVER

Edward Bauman, Chicago, Ill., assignor to Motorola, Inc., Chicago, Ill., a corporation of Illinois Application January 23, 1952, Serial No. 267,888
10 Claims. (Cl. 250—20)

The present invention relates to communication receiving system and more particularly to a selective squelch system for controlling communication receiver audio circuits to reproduce only the detected signals from a particularly identified carrier signal.

Communication receivers which are used in vital communications services such as police and fire departments or the like, are usually fixed tuned to a certain communication frequency channel and are adapted to be continuously energized in stand-by condition. Frequency modulation is extensively used in such communication service, and such receivers tend to reproduce audible noise when not receiving the carrier frequency of the communication signal to which the receiver is tuned. Prior to this invention, squelch circuits have been used to mute the audio reproducing circuits of a receiver when not receiving a carrier signal from the communication channel to which the receiver is tuned. When using such squelch circuits, even though the receiver is continuously energized in a ready or stand-by condition to receive communication signals, the undesired signals together with annoying audible noise are not reproduced in the absence of a carrier signal for which the receiver is tuned. Reference may be made to the U. S. Patent to D. E. Noble No. 2,343,115 issued February 29, 1944, for a detailed description of such squelch systems.

When a plurality of receivers are used in a single communication net-work and are all tuned to the same communication channel frequency, it may be desirable to selectively call and communicate with only one, or selected ones, of the receivers. Selective call systems for such use are well known and they usually require a signal or combination of signals to be transmitted at the beginning of each transmission period to automatically operate or connect a selected receiver for reproducing communications. It is, of course, desirable to operate the selective call system by a single tone signal from the standpoint of simplification of the receiver and transmitter apparatus when such operation is feasible.

It is an object of this invention to provide a selective squelch circuit for a communication receiver that is selectively operated to open the squelch in response to the reception of a communication carrier signal modulated by a predetermined selective call identifying signal.

Another object of the invention is to provide a frequency modulation communication receiver having a selective squelch system to mute the reproduction of audio signals until after a carrier signal modulated with a predetermined preliminary identifying signal is received.

Yet another object of the invention is to provide a squelch circuit for a communication receiver that is operative to mute the audio reproducing means of the receiver until a desired carrier signal is received, the squelch circuit being maintained opened or operative to permit the reproduction of the audio signal after the predetermined preliminary identifying modulation tone signal of the carrier signal has been received.

A feature of the invention is the provision in a communication receiver of a squelch circuit controlled to open the squelch upon the instantaneous and simultaneous application thereto of two control voltages; one control voltage being derived from the received carrier signal and the other control voltage being derived from a predetermined modulation signal of the received carrier signal.

Another feature of the invention is the provision of a communication receiver squelch control network having means to open the squelch in response to the instantaneous application to the network of first and second control voltages, together with means to modify the control function of the network after the instantaneous application of the two control voltages to keep the squelch open so long as the first control voltage continues to be applied to the network; the first control voltage being produced by means responsive to a received carrier signal, and the second control voltage being produced by means responsive to a selected modulation tone or frequency as received at the beginning of a desired communication.

Further objects, features, and the attending advantages of the invention will be apparent with reference to the following specifications and drawings in which.

In practicing the invention, a frequency modulation receiver is provided with a squelch circuit including a tube or relay to mute the audio reproducing circuits in the absence of a selected carrier signal. The squelch relay is an electron tube connected in cascade between the audio output terminals of the receiver detector and the audio amplifier input terminals. This tube is normally biased beyond cutoff to be non-conductive and thereby prevent transmission of audio signals to the audio amplifier. A squelch control circuit is connected to the squelch tube including two electron tubes which are normally conductive. One of the tubes is rendered non-conducting in the presence of a carrier signal by a circuit of known type which provides a control voltage in accordance with the relative amplitude of the received carrier signal and voice. The second tube is rendered non-conducting by a control voltage produced in response to an identifying selective signal. The two electron tubes are so connected with the squelch tube as to apply a countermanding bias to the squelch tube and make the squelch tube conductive to thus open the squelch when said two electron tubes are non-conductive. A normally non-conductive control tube is also provided in the squelch control circuit which is made conductive by the instantaneous application of the two squelch control voltages for making the first two tubes non-conductive. The control tube will remain conductive so long as the first squelch control voltage is present. The control tube is further connected in the squelch control circuit so that it keeps both of the first two electron tubes non-conductive so long as it is conductive. The squelch tube therefore remains conductive so long as the first squelch control voltage is continued to be applied. At the end of the transmission period, when the transmission of the carrier signal is interrupted, the production of the first squelch control voltage is interrupted and the control tube again becomes non-conductive and the first two tubes become conductive so that the countermanding bias on the squelch tube is removed to thereby close the squelch.

Figures 1, 2:
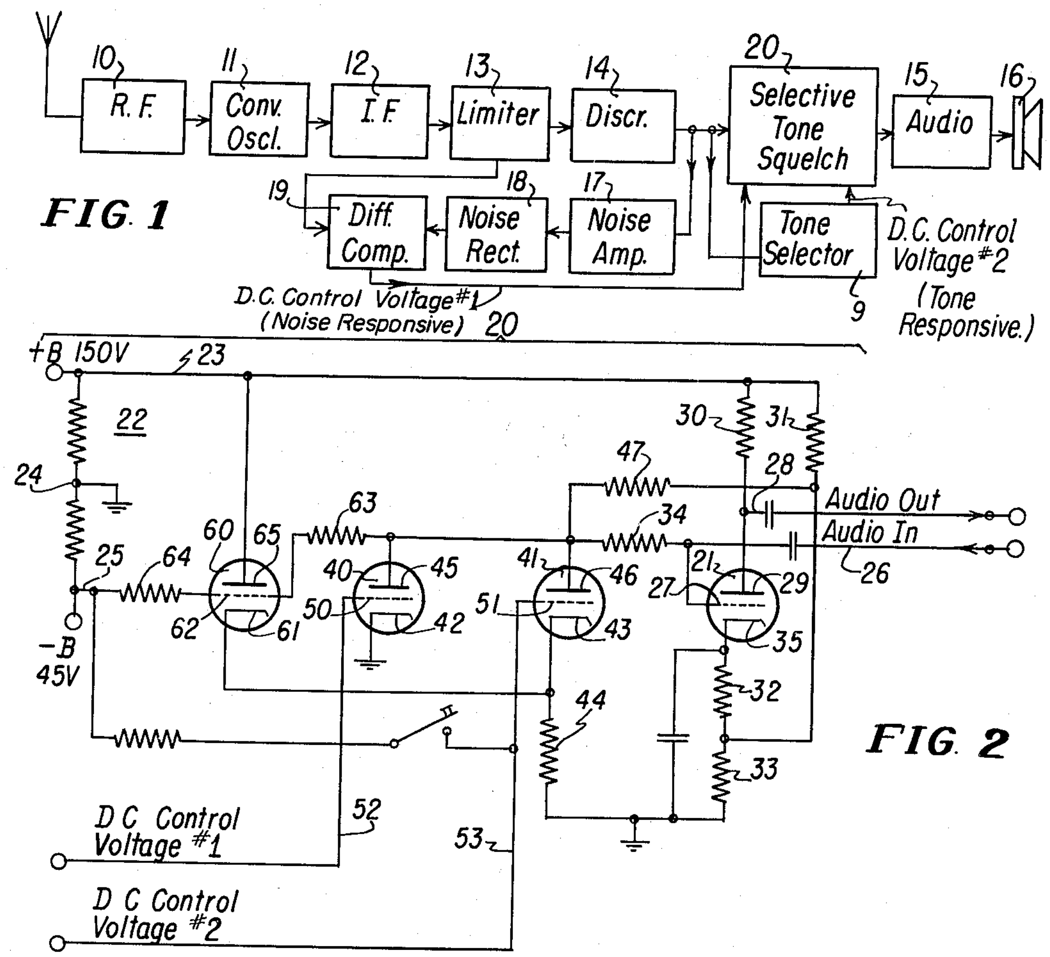
Fig. 1 is a block diagram of a receiver in accordance with the invention.
Fig. 2 is a schematic of the audio squelch circuit of Fig. 1.

With reference to Fig. 1 of the drawings, the selective squelch circuit will be described in connection with its use in a frequency modulation communication receiver. The communication receiver comprises a tuned radio frequency stage 10, the converter and oscillator stage 11, the intermediate frequency amplifier stage 12, the limiter stage 13, the discriminator stage 14, and the audio amplifying stage 15 connected to audio reproducing apparatus 16.

A noise amplifier stage 17 is connected to amplify the noise produced at the output of the discriminator stage 14 and the noise thus amplified is rectified by the noise rectifier stage 18 to produce a first direct current voltage in the differential comparing circuit 19. A second direct current voltage developed by the limiter 13 in accordance with the average amplitude value of the R. F. signals and noise at the limiter stage is also applied to the differential comparer 19. The two direct current voltages thus produced are compared in the differential comparer 19 which may be adjusted to produce a direct current squelch control voltage of negative polarity only when a carrier signal to which the receiver is tuned is received. This direct current squelch control voltage is identified as control voltage No. 1 for purposes of the present disclosure and is applied to the selective squelch circuit 20 to be described more in detail.

Another control voltage identified as control voltage No. 2 is provided by the tone selector 9 in response to the application of a predetermined signal from the discriminator 14. The circuit of the tone selector 9 will be described more in detail hereafter. The selective squelch circuit 20 responds to the two control voltages to selectively apply signals to the audio reproducing stage 16.

Referring now to Fig. 2 of the drawings, a selective squelch control circuit 20 including the squelch tube 21 is shown in detail. A source of direct current for energizing the circuit is shown at 22 and is provided with a terminal line 23 in which a positive voltage of approximately 150 volts is developed, a grounded terminal 24, and a terminal line 25 in which a negative voltage of approximately 45 volts is developed. The squelch control tube is of the grid controlled type and the audio signal from the receiver detector 14 is connected by line 26 to be applied to the control grid 27 of the tube 21. The audio output signal to be connected to the receiver audio amplifier 15 is passed through line 28 connected to the plate 29 of the squelch tube 21. The squelch tube 21 is provided with a plate resistance 30 and cathode bias resistances 31, 32 and 33 to bias the squelch tube to be normally non-conductive and thus prevent the transmission of audio signals from line 26 to line 28. In order to make the squelch tube 21 conductive, an additional countermanding bias is applied through the grid current limiting resistor 34 with a polarity such as to make the grid 27 more positive with respect to the cathode 35 and thus make the squelch control tube conductive.

First and second grid controlled electron tubes 40 and 41 are provided to modify the bias voltage developed in the resistor 34 for application to the squelch tube 21. The two tubes 40 and 41 are biased to be normally conductive. The cathode 42 of tube 40 is grounded while the cathode 43 of tube 41 is connected to ground through a common cathode bias resistor 44. Plate electrodes 45 and 46 of the tubes 40 and 41 respectively are connected together and through the plate load resistance 47 to the bias resistor 31 of the squelch tube 21 and thence to the B plus line 23. The values of the associated resistance 31, 32, 33, 44 and 47 are such that when tubes 40 and 41 are conductive, the potentials of their plate electrodes are less positive so that the control grid 27 of the squelch tube is negative with respect to the cathode 35, thus maintaining the squelch tube in the cut-off or non-conducting condition. When the tubes 40 and 41 are both made non-conductive, the potential of their plate electrodes 45 and 46 becomes more positive to make the control grid 27 of the squelch tube more positive and thus open the squelch.

In order to make the tubes 40 and 41 non-conductive, direct current control voltages of negative polarities are applied to their control grids 50 and 51 respectively. The direct current control voltage No. 1 is applied to the control grid 50 of tube 40 through line 52. This may be the squelch voltage developed by the comparator 19 of Fig. 1, in response to the relative average amplitude values of the received carrier signal and noise, such as has been described in detail in the aforementioned United States Patent to D. E. Noble No. 2,343,115 issued February 29, 1944.

The direct current control voltage No. 2 of negative polarity developed in line 53 and applied to the control grid 51 of tube 41 to make tube 41 non-conductive may be developed by the tone selector 9 of Fig. 1. This voltage is produced in response to a predetermined identifying selective call modulation signal which may have a single tone or identifying frequency for modulating the carrier signal at the beginning of a transmission period. Examples of selective circuits for amplifying and rectifying the identifying modulation signal to produce the direct current control voltage No. 2 will be described in detail in connection with Figs. 3 and 4 of the drawings.

Normally conductive tubes 40 and 41 are both made nonconductive upon the simultaneous application of negative polarity control voltages to their respective control grids and when both of the tubes 40 and 41 are nonconductive the squelch tube 21 is made conductive to open the squelch. The tube 41 insofar as it has been described is normally conductive but is made nonconductive upon the application of the direct current control voltage No. 2. As previously stated, the direct current control voltage No. 2 is only developed for a short time at the beginning of the transmission period by the selective tone identifying modulation frequency. In order to keep the tube 41 non-conductive after the direct current control voltage No. 2 is no longer produced and during the remainder of the transmission period in order that the squelch tube 21 will be kept conductive during the remainder of the transmission period, the third grid controlled electron discharge control tube 60 is provided. The cathode 61 is connected to the cathode 43 of tube 41. The control grid 62 is connected by the grid current limiting resistor 63 to the plate electrodes 45 and 46 of tubes 40 and 41. The control grid 62 is further connected by the grid biasing resistor 64 to negative terminal line 25 of the energizing power supply. The bias voltage developed in the resistor 64 normally tends to maintain the tube 60 non-conducting. The plate electrode 65 of the tube 60 is connected directly to the B plus line 23 and thus the tube 60 is connected in a cathode follower circuit.

When the tubes 40 and 41 are made non-conductive by the application of the direct current control voltages No. 1 and No. 2 to their respective control grids, the potentials of their plate electrodes 45 and 46 become more positive so that a more positive potential is developed across resistor 63 and applied to the control grid 62 of the third tube 60 to overcome the negative bias developed by the grid bias resistor 64 and thus make the tube 60 conductive. Upon conduction of the tube 60, the bias voltage developed across the cathode bias resistor 44 which is the common current path for both tubes 60 and 41 is sufficient to keep the tube 41 non-conductive even though the direct current control voltage No. 2 may be no longer produced after the transmission of the identifying modulation signal has been stopped. Thus, in such manner, the squelch tube 21 is maintained conductive while tubes 40 and 41 are maintained nonconductive during the continued development of direct currrent control voltage No. 1 from the conventional squelch voltage circuit of the receiver.

When the transmission period is ended and the carrier signal is no longer received by the receiver, the direct current control voltage No. 1 is no longer developed and tube 40 becomes conductive to lower its plate voltage and make tube 60 again non-conductive. As tube 60 becomes non-conductive, tube 41 again becomes conductive and the squelch tube 21 is thereby cutoff since the plates 45 and 46 of tubes 40 and 41 have again become more negative sufficient to make the control grid 27 of the squelch tube negative with respect to its cathode.

Figure 3:
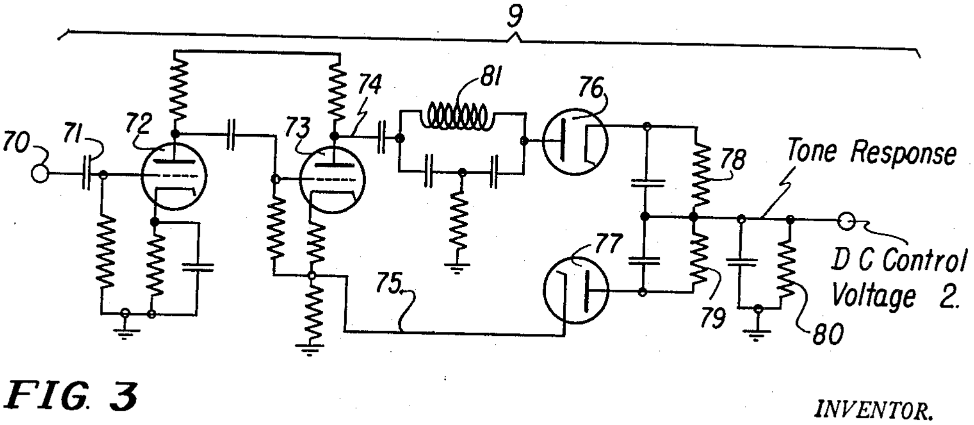
Fig. 3 is a schematic wiring diagram showing one embodiment of the selective control voltage source of Fig. 1.

For a detailed description of the tone selector 9, reference is made to Fig. 3. The audio modulation signals detected by the discriminator 14 are applied to the input terminal 70 and through coupling condenser 71 to the audio amplifying tube 72 in a resistance coupled triode amplifying circuit. The amplified audio signals from tube 72 are applied to the control grid of a phase inverter tube 73 which splits the audio signals into two paths 74 and 75 respectively. The audio signal path 74 is provided with a trap circuit 81 tuned to pass all signals except those of a predetermined frequency only corresponding to the identifying tone or frequency to be transmitted at the beginning of the transmission period. The audio signal path 75 is untuned. The signals passed by both branches 74 and 75 are rectified by the rectifier tubes 76 and 77 connected with opposite polarities respectively such as to produce direct current voltages across resistors 78, 79 and 80 which are in opposition to each other and differentially compared. As previously stated the trap circuit 81 tends to prevent the passage of any signals of the identifying frequency to the rectifier 76 while such signals may be readily passed by the audio path 75 to the rectifier 77. The rectifier polarity connections are such that a negative polarity direct current control voltage No. 2 is developed across resistance 80 in line 53 when the identifying signal of the frequency to which the trap circuit 81 is tuned is received and detected by the discriminator 14.

Figure 4:
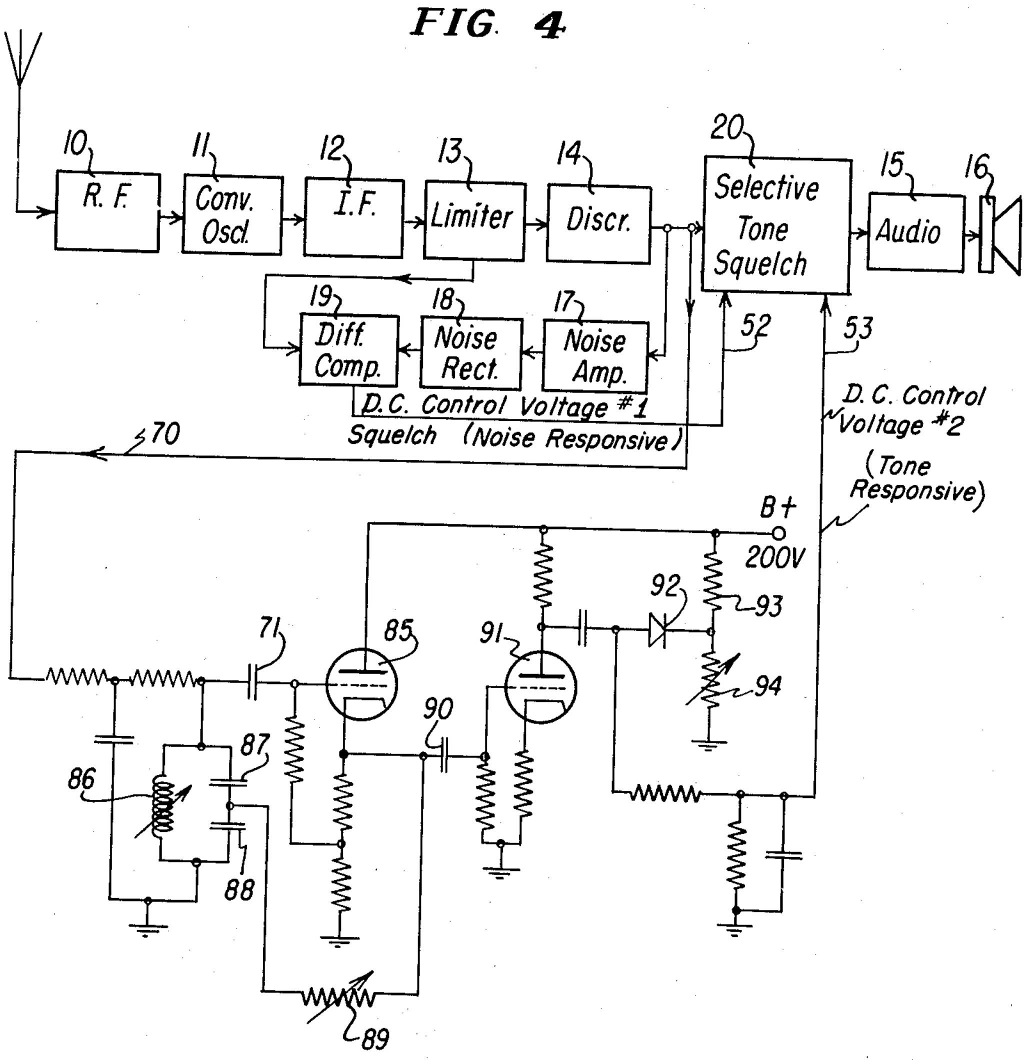
Fig. 4 illustrates a second embodiment of the invention.

The receiver circuit of Fig. 4 is substantially the same as that previously described except that the frequency selective circuit adapted to respond to the predetermined identifying selective call signal for producing the direct current control voltage No. 2 is different. As shown in Fig. 4 the audio signals detected by the discriminator 14 are applied through line 70 and coupling condenser 71 to the control grid of a cathode follower amplifier tube 85. A tuned frequency regenerative feedback network comprising the inductance 86, condensers 87 and 88 and adjustable feedback resistance 89 is provided. The adjustable inductance 86 and the adjustable resistor 89 are adjusted to tune the feedback circuit to respond to the selected frequency of identifying selective call signal so that amplified signals appearing across the coupling condenser 90 at the cathode of the cathode follower tube 85 are of considerably more amplitude when such signals are of the tuned frequency of the feedback circuit. The amplified signals appearing across the coupling condenser 90 are further amplified by the resistance coupled amplifying tube 91. The amplified signals at the output of the amplifier tube 91 are applied to a circuit including a rectifier 92 for rectifying the amplified signals. The rectifier 92 is also connected to the junction between the resistance 93 and the variable resistance 94 to a source of direct current. The direct current source is connected with a polarity to oppose the rectified current developed by the rectifier 92. By adjusting the value of the adjustable resistance 94, the circuit may be caused to produce a negative control voltage No. 2 in the line 53 when signals of the predetermined identifying frequency are amplified by the tuned regenerative amplifier circuit including tubes 85 and 91.

The selective tone squelch circuit 20 as described is adapted to be operated to open the squelch only upon simultaneous instantaneous application of two direct current control voltages, a first direct current voltage produced by the received carrier signal, and a second control voltage produced by an identifying call signal of predetermined frequency to be transmitted at the beginning of a transmission period. The selective squelch circuit of the invention is further provided with controlling relay means to keep the squelch open during the transmission of the carrier signal after the preliminary identifying signal has been received. In the embodiment of the invention particularly described in connection with Figs. 3 and 4 of the drawing, two different means have been described in detail for producing the second direct current control voltage in response to the detection by the receiver of a single tone identifying frequency which may be within the audio frequency range and it should be understood that other frequency selective circuits may be used.

While the invention has been particularly described in connection with its use in frequency modulation receivers it should be understood that the selective squelch system may be used to equal advantage in other types of communication receivers where it is desired to mute the receiver audio system circuit except when a desired signal is to be received and reproduced. The use of vacuum tube relay devices has been particularly described, but it will be understood that electro-mechanical forms of relays may be used in place of the described vacuum tube function.

Various modifications may be made within the spirit of the invention and the scope of the appended claims.

I claim:

1. A communication receiver adapted to receive and detect a modulated carrier wave of a predetermined frequency and having audio signal reproducing means, and a selective squelch system operatively connected to said reproducing means for controlling the operation thereof, said squelch system including control means normally holding said reproducing means inoperative, means for producing a first control voltage in response to a carrier wave of said predetermined frequency, means for producing a second control voltage in response to a predetermined modulating signal, means to apply said first and second control voltages to said control means, said control means operating to render said reproducing means operative only upon simultaneous application of both said first and second control voltages, and means operating automatically in response to the simultaneous production of said first and second control voltages and otherwise independent of the operation of the receiver coupled to said control means and holding the same operating in response to said first control voltage only.

2. In a communication receiver having tuned circuits adapted to receive and detect the audio modulation signals of a modulated carrier signal in a selected channel of signal frequencies, said receiver having audio signal reproducing circuits, said tuned and reproducing circuits being adapted to be continuously energized, the selective squelch system operative to prevent the reproduction of audio modulation signals by said reproducing circuits until after the reception of a carrier signal having a predetermined identifying signal frequency of audio modulation, including in combination, relay means adapted to be actuated to connect said tuned circuits to said reproducing circuits for reproduction of audio modulation, relay control means, means to produce a first control voltage when a carrier signal is detected by said tuned circuits, means to produce a second control voltage when said predetermined identifying signal modulation is detected, means to apply said first and second control voltages to said relay control means so that each of said control voltages tends to actuate said relay means, said relay control means being adapted to initially actuate said relay means only upon instantaneous application of both of said first and second control voltages, and means operating automatically in response to the instantaneous production of said first and second control voltages to modify said control means to thereby continue actuation of said relay means upon continued application of said first control voltage alone after said second control voltage is no longer produced.

3. In a communication receiver having circuits adapted to receive and detect a modulated carrier wave in a selected frequency channel and having audio signal reproducing circuits, a selective squelch system operative to prevent the reproduction of audio modulation signals until after the reception of a carrier signal having a predetermined identifying modulating signal, a grid-controlled squelch tube connected in cascade between said detecting and reproducing circuits, biasing means coupled to said squelch tube and normally biasing the same beyond cut-off, means to produce a first bias control voltage in response to a carrier wave in said selected channel, means to produce a second bias control voltage in response to said predetermined identifying signal, means to apply said first and second bias control voltages to said biasing means so that each of said control voltages reduces the squelch tube bias and said first and second control voltages in combination reduce the bias sufficiently to render said squelch tube conductive, and means coupled to said biasing means operating automatically in response to the instantaneous production of said first and second bias control voltages for controlling said biasing means so that bias is applied to said squelch tube for rendering the same conductive upon continued application of said first bias control voltage only.

4. In a communication receiver having tuned circuits adapted to receive and detect the audio modulation signals of a modulated carrier signal in a selected channel of signal frequencies, said receiver having audio signal reproducing circuits, said tuned and reproducing circuits being adapted to be continuously energized, the selective squelch system operative to prevent the reproduction of audio modulation signals by said reproducing circuits until after the reception of a carrier signal having a predetermined identifying signal frequency of audio modulation, including, a grid controlled squelch tube connected in cascade between said tuned and reproducing circuits, means to normally bias said squelch tube beyond cut-off, squelch tube bias control means, means to produce a first bias control voltage when a carrier signal is detected by said tuned circuits, means to produce a second bias control voltage when said predetermined identifying audio modulation signal is detected, means to apply said first and second bias control voltages to said bias control means so that each voltage reduces the squelch tube bias and said squelch tube is rendered conductive upon instantaneous application of both of said first and second bias control voltages, and means operating automatically in response to the instantaneous production of said first and second bias control voltages to vary said bias control means to thereby continue the modification of the bias of said squelch tube to be conductive upon continued application of said first bias control voltage alone after said second bias control voltage is no longer produced.

5. In a communication receiver having modulated carrier signal receiving, detecting and modulation reproducing circuits adapted to be continuously energized to receive both desired and undesired communication signals; the selective squelch system for connecting said receiving circuits to said reproducing circuits when a desired signal having a predetermined identifying modulation frequency is received, including in combination, first relay means adapted to be actuated to connect said signal receiving circuits to said signal reproducing circuits, control means operative to actuate said first relay means, said control means being operative upon instantaneous application thereto of first and second control voltages, means responsive to the carrier amplitude of a received communication signal to produce said first control voltage, means responsive to the identifying modulation frequency to produce said second control voltage, said control means having second relay means operated automatically by the instantaneous production of both of said first and second control voltages and otherwise independent of the operation of the receiver to modify said control means to thereby continue the actuation of said first relay during continued production of said first control voltage alone after said second control voltage is no longer produced.

6. In a communication receiver having tuned circuits adapted to receive and detect the audio modulation signals of a modulated carrier signal in a selected channel of signal frequencies, said receiver having audio signal reproducing circuits, said tuned and reproducing circuits being adapted to be continuously energized; the selective squelch system operative to prevent the reproduction of audio modulation signals by said reproducing circuits until after the reception of a carrier signal having a predetermined identifying signal modulation frequency, including; relay means adapted to be energized to connect said tuned circuits to said reproducing circuits for reproduction of audio modulation; relay control means comprising first, second and third electron discharge tubes having at least cathode, control grid, and plate electrodes; means to normally bias said first and second tubes to be conductive; means to normally bias said third tube to be non-conductive; means connecting the plate electrodes of said first and second tubes to the control grid electrode of said third tube to bias said third tube to be conductive when both of said first and second tubes are biased to be non-conductive; means connecting the cathode electrode of said second tube to the cathode electrode of said third tube to bias said second tube to be non-conductive when said third tube is conductive; means connecting the plate electrodes of said first and second tubes to energize said relay when said first and second tubes are non-conductive; means to produce a first bias control voltage when a carrier signal is detected by said tuned circuits; means to produce a second bias control voltage when said predetermined identifying modulation signal is detected; means to apply said first control voltage to the control grid of said first tube to thereby bias said first tube to be non-conductive; and means to apply said second control voltage to said second tube to thereby bias said second tube to be non-conductive.

7. The invention of claim 6 in which said means to produce a second bias control voltage comprises a circuit tuned to the frequency of the identifying modulation signal, and a rectifier connected to the tuned circuit to rectify the identifying signal to produce a direct current control voltage in accordance with the amplitude of the identifying signal.

8. In a communication receiver having tuned circuits adapted to receive and detect the audio modulation signals of a modulated carrier signal in a selected channel of signal frequencies, said receiver having audio signal reproducing circuits, said tuned and reproducing circuits being adapted to be continuously energized; the selective squelch system operative to prevent the reproduction of audio modulation signals by said reproducing circuits until after the reception of a carrier signal having a predetermined identifying signal modulation frequency, including; a grid controlled squelch tube connected in cascade between said tuned circuits and said reproducing circuits, means to normally bias said squelch tube to be non-conductive, squelch tube bias control means comprising first, second and third electron discharge tubes having at least cathode, control grid, and plate electrodes; means to normally bias said first and second tubes to be conductive; means to normally bias said third tube to be non-conductive; means connecting the plate electrodes of said first and second tubes to the control grid electrode of said third tube to bias said third tube to be conductive when both of said first and second tubes are biased to be non-conductive; means connecting the cathode electrode of said second tube to the cathode electrode of said third tube to bias said second tube to be non-conductive when said third tube is conductive; means connecting the plate electrodes of said first and second tubes to the control grid of said squelch tube to bias said squelch tube to be conductive when said first and second tubes are non-conductive; means to produce a first bias control voltage when a carrier signal is detected by said tuned circuits; means to produce a second bias control voltage when said predetermined identifying modulation signal is detected; means to apply said first control voltage to the control grid of said first tube to thereby bias said first tube to be non-conductive; and means to apply said second control voltage to said second tube to thereby bias said second tube to be non-conductive.

9. In a frequency modulation receiver having limiter and discriminator stages together with audio signal amplifying and reproducing means, said receiver being adapted to be energized in a ready state to receive audio modulated carrier signals and noises to be detected and reproduced by said reproducing means; a selective squelch circuit to prevent reproduction of undesired audio signals and noise until a desired identifying signal is received including; relay means in said circuit operative to connect said discriminator stage to said audio reproducing means for reproducing the audio modulation; control means responsive to the simultaneous application thereto of first and second direct current control voltages to operate said relay means; first means to produce said first direct current control voltage in accordance with the relative average amplitude values of received carrier signals and noise; second means to produce said second direct current control voltage when the desired identifying signal is received; and connecting means to apply said first and second control voltages to said control means to operate said relay; said first means including means to rectify the noise produced by said discriminator stage to derive a first direct current, means to derive a second direct current voltage from the signal and noise developed in said limiter stage, and means to compare said first and second direct currents to produce said first direct current control voltage only when a carrier signal is received; said second means including means to select and rectify the desired identifying signal only to produce said second control voltage.

10. In a frequency modulation receiver having limiter and discriminator stages together with audio signal amplifying and reproducing means, said receiver being adapted to be energized in a ready state to receive audio modulated carrier signals and noise to be detected and reproduced by said reproducing means, a selective squelch circuit to prevent reproduction of undesired audio signals and noise until a desired identifying signal is received including, relay means in said circuit operative to connect said discriminator stage to said audio reproducing means for reproducing the audio modulation, control means responsive to the simultaneous application thereto of first and second direct current control voltages to operate said relay means, first means to produce said first direct current control voltage in accordance with the relative average amplitude values of received carrier signals and noise, second means to produce said second direct current control voltage when the desired identifying signal is received, and connecting means to apply said first and second control voltages to said control means to operate said relay, said first means including means to rectify the noise produced by said discriminator stage to derive a first direct current voltage, means to derive a second direct current voltage from the signal and noise developed in said limiter stage, and means to compare said first and second direct current voltages to produce said first direct current control voltage only when a carrier signal is received.

References Cited in the file of this patent

UNITED STATES PATENTS

| | | |
|---|---|---|
| 2,354,508 | Dome | July 25, 1944 |
| 2,450,818 | Vermillion | Oct. 5, 1948 |
| 2,479,305 | Brown | Aug. 16, 1949 |
| 2,521,752 | Schwarz | Sept. 12, 1950 |
| 2,546,987 | Eannarino | Apr. 3, 1951 |
| 2,610,293 | Hanchett | Sept. 9, 1952 |